United States Patent [19]
Erdkonig

[11] 3,807,844
[45] Apr. 30, 1974

[54] FILM-HANDLING APPARATUS

[75] Inventor: Andreas Erdkonig, Schwechat, Austria

[73] Assignees: Karl Vockenhuber; Raimund Huaser, both of Vienna, Austria

[22] Filed: Mar. 13, 1970

[21] Appl. No.: 19,254

[52] U.S. Cl............... 352/157, 242/192, 242/205
[51] Int. Cl.... G03b 1/58, G03b 23/04, B65h 17/14
[58] Field of Search.......... 242/192, 195, 197, 205, 242/189, 190; 352/159, 158, 157; 226/91, 92

[56] References Cited
UNITED STATES PATENTS

| | | | |
|---|---|---|---|
| 1,024,661 | 4/1912 | Wright | 352/159 |
| 3,552,683 | 1/1971 | Bundschuh et al. | 242/192 |
| 3,584,943 | 6/1971 | Roman | 352/158 X |

*Primary Examiner*—George F. Mautz

[57] ABSTRACT

The apparatus comprises film-guiding means for guiding a film in a path which comprises a looped portion, a control device, a film-damping feeler, and spring means tending to move the feeler into contact with film in said looped portion. The feeler is responsive to the tension of film in contact with said feeler is responsive to the tension of film in contact with said feeler and to operate the control device in response to a position in which the tension of the film in contact with said feeler is outside a predetermined range. A film-threading device is provided, which are movable between an inoperative position and a threading position and in the latter are adapted to thread film into the film path. A lifting device is arranged to move the feeler out of the film path against the action of the spring means in response to a movement of the film-threading means to the threading position. A means is arranged operatively to connect the feeler and control device unless the film-threading device is in said threading position.

11 Claims, 6 Drawing Figures

PATENTED APR 30 1974

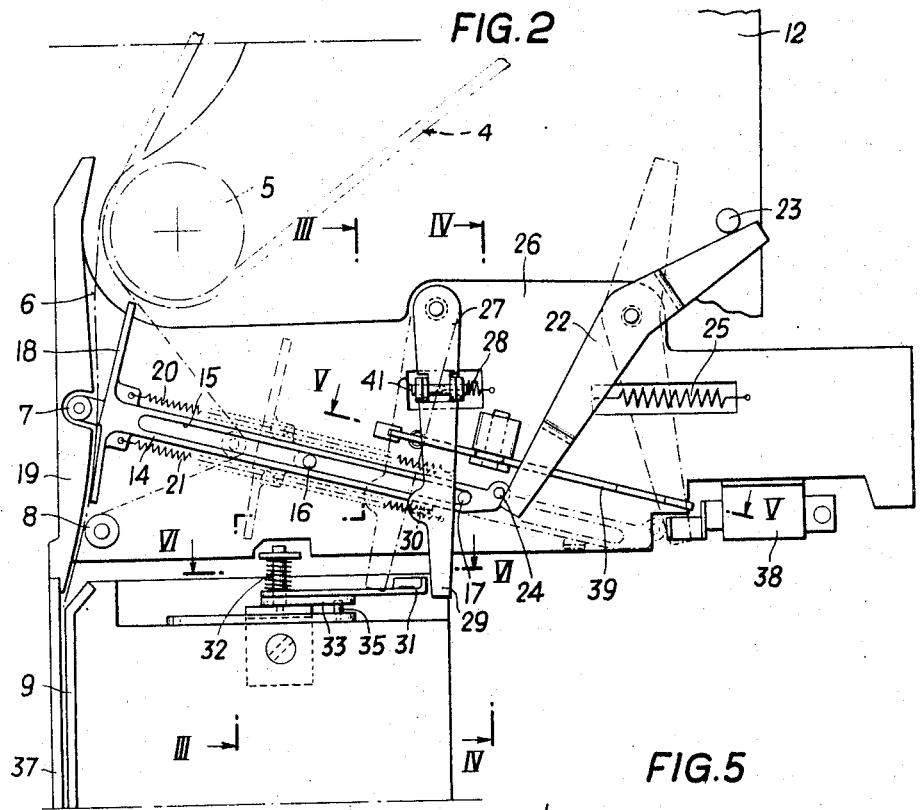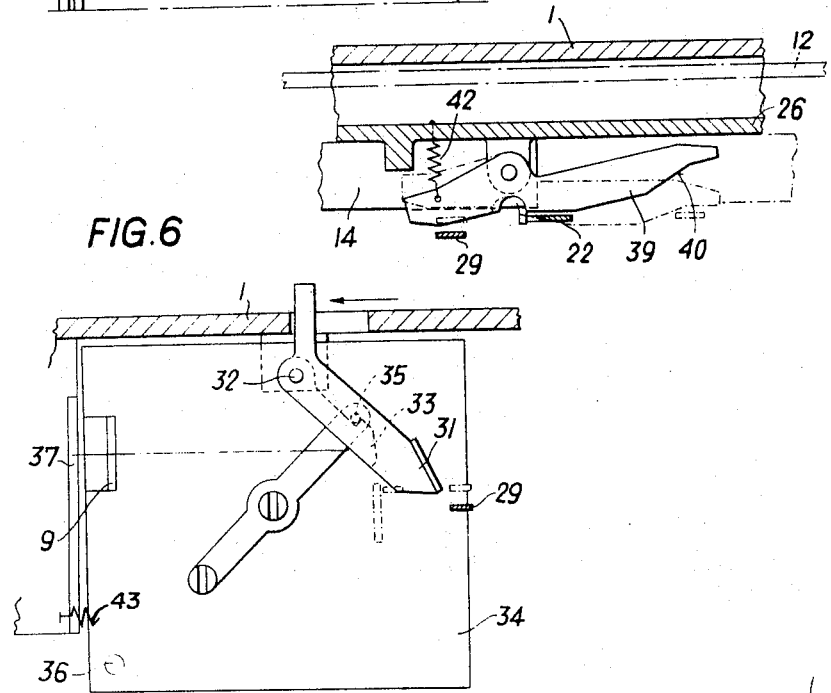

FIG.3
FIG.4
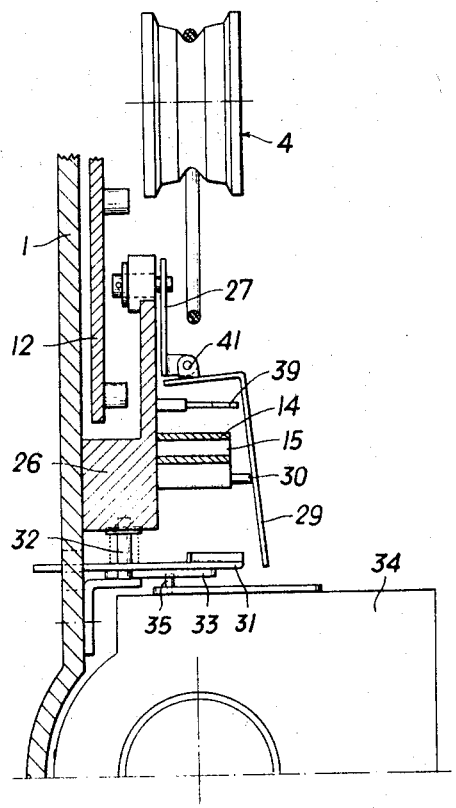
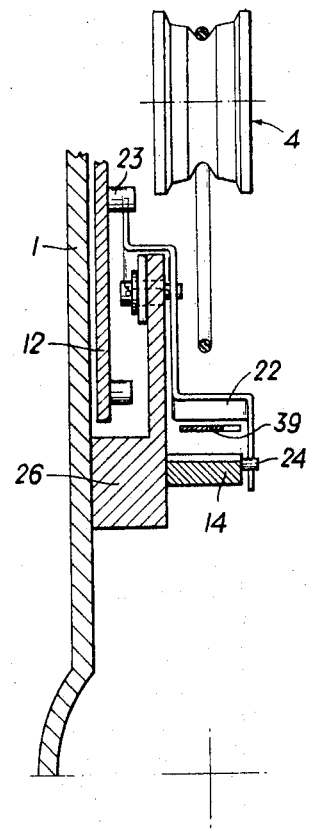

FILM-HANDLING APPARATUS

This invention relates to film-handling apparatus, particularly a motion picture projector, which comprises a resilient feeler in contact with a film loop, and a switching device, particularly for controlling the projector drive, which device is arranged to be operated when the film contacting the same has a tension which differs from the tension to which the film is subjected during normal operation. In known arrangements, such feelers are used to de-energize the film-handling apparatus or to reverse it for a backwinding operation at the end of the performance. For this purpose, the trailing end of the film is fixed to the hub of the supply reel so that the tension of the film increases suddenly when the entire film has been unwound. The feelers described above may also be used as switches which are responsive to a tearing of the film, and as limit switches. In the latter case, the apparatus is de-energized when the tension of the film is reduced because the film has been torn or because the trailing end of the film has moved past the feeler. In apparatus arranged for an automatic threading of the film, the feeler must be retracted from the path of the film as the latter is threaded in order to ensure a satisfactory introduction of the leading end of the film. This position of the feeler would be the same as in case of an extremely high film tension. Normally, the position assumed by the feeler during a threading operation would correspond to the position assumed by the feeler when the film loop is taut so that the film is under high tension. Whereas it would be possible to hold the feeler in an intermediate position during the threading of the film, this would require expensive means for guiding the film as it is threaded.

The invention solves the problems set forth hereinbefore in that the feeler, which may serve in known manner as a film-damping means in a film feed system, particularly one having no sprockets, assumes the same position during the threading of the film and during a fast backwinding and a means is provided between the feeler and the control device and is operable in response to the threading mechanisms of the apparatus and interrupts the operative connection between the feeler and the control device when the threading mechanisms is in the threading position, whereas the means connects the feeler to the switching device when the threading mechanisms is in other than the threading position. In this arrangement, the feeler may be used to guide the film as the latter is threaded because the feeler carries a film-guiding surface, which when the feeler is in its threading position cooperates with stationary guiding surfaces to form a closed film guide, in a preferred embodiment of the invention.

Further features of the invention will become apparent from the following description of an embodiment shown by way of example in the drawing, in which FIG. 1 is a diagrammatic view showing a motion film projector for use with cartridges; the projector comprises means for an automatic threading of the film, FIG. 2 is an enlarged view showing a detail of the projector shown in FIG. 1.

FIG. 3 is a sectional view taken on line III—III in FIG. 2.

FIG. 4 is a similar view taken on line IV—IV in FIG. 2.

FIG. 5 is a sectional view taken on line V—V in FIG. 2 and

FIG. 6 is a sectional view taken on line VI—VI in FIG. 2.

Figure 1:
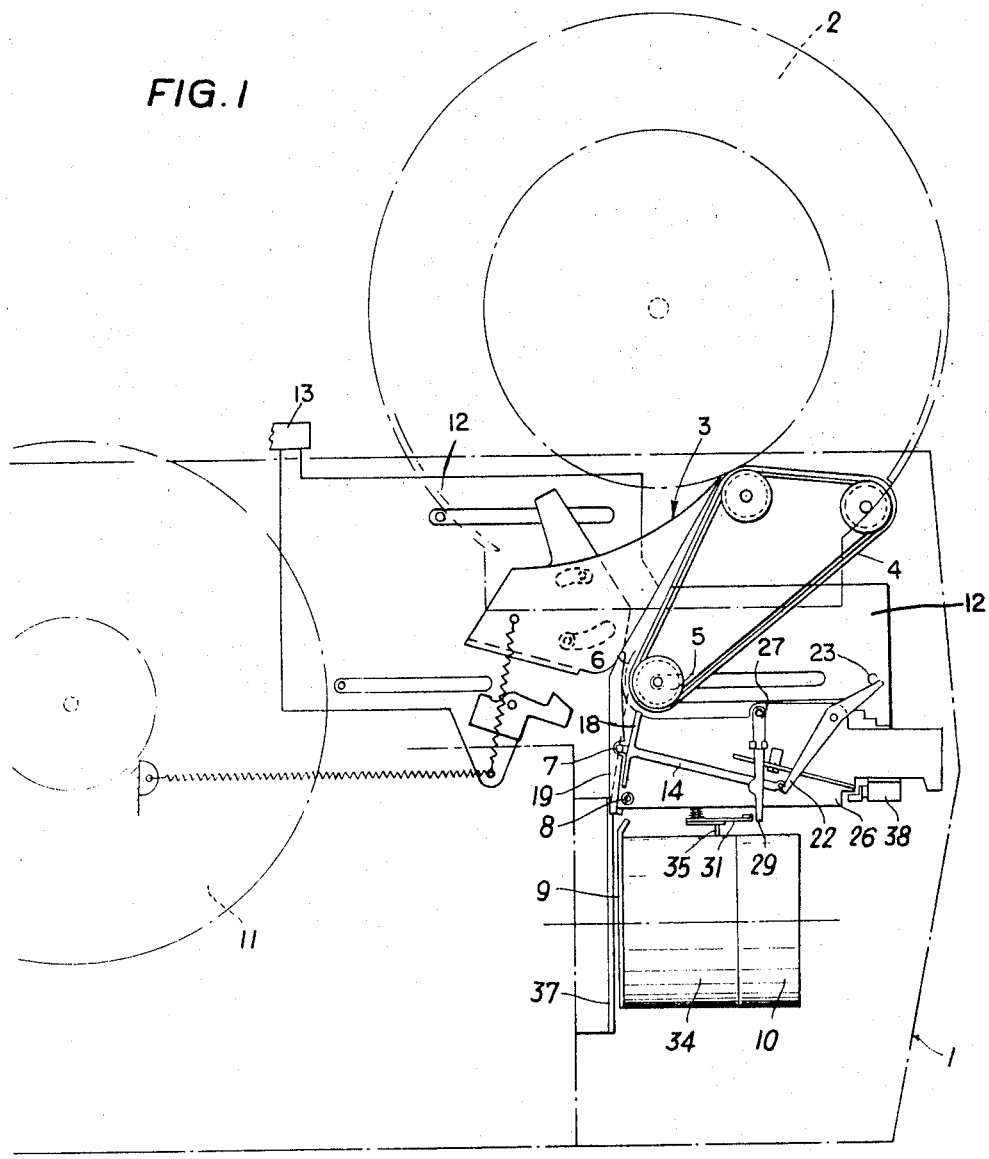

The substandard film projector 1 shown in the drawing is arranged for use with film cartridges 2. By a threading mechanism which comprises a stripper 3 and a belt drive 4, the film is moved in known manner out of the cartridge and moves around a roller 5 and in a film loop 6 in contact with a feeler 7 and finally moves around a deflecting roller 8 and over the spring loaded pressure plate 9 of the apparatus. An illuminating system, not shown, and a lens 10 serve to project successive frames of the film onto a screen, not shown. The film which has moved past the pressure plate 9 is wound up on a take-up reel 11. The control of the threading mechanisms and specifically the introduction of the stripper and the belt drive into the cartridge is performed by a slider 12, which is adjustable by means of a key 13.

The feeler 7 comprises a deflecting roller, which is mounted on a slider 14 and in direct contact with the film. The slider 14 has a slot 15, through which two stationary pins 16 and 17 extend so that the slider 14 is guided in its longitudinal direction. The slider 14 carries also a film-guiding surface 18, which is indicated in solid lines in FIG. 2 in its threading position, in which the surface 18 together with the stationary film gate 19 defines a virtually closed film guide between the roller 5 and the deflecting roller 8. The coil springs 20 and 21 acting on the slider 14 tend to move the slider to its operating position, which is indicated in dotted lines in FIG. 2. The slider is held in its threading position by a two-armed lever 22, which is operated by a pin 23, which is mounted on the threading slider 12. The offset second arm of the lever (see FIG. 4) bears on a pin 24 of the slider 14 to move the same to its left-hand end position (FIG. 2). When the threading slider 12 has been retracted, the spring 25 returns the lever 22 to its position of rest indicated in dotted lines in FIG. 2. A one-armed lever 27 is pivoted to the plate 26, which carries the slider 14 and the lever 22. The lever 27 is biased by a spring 28. An L-shaped offset lever 29 is pivoted to the free end of the lever 27 and cooperates with an extension 30 carried by the slider 14. A two-armed lever 31 lies opposite to the free end of the lever 29 and is pivoted to the projector housing at 32 (see also FIG. 6). The lever 31 carries a detent pawl 33, by which a detent pin 35 mounted on the lens carrier 34 is held in position for use, shown in FIG. 6, against the force of a spring 43.

When the slider 14 is in a position indicated in dotted lines in FIG. 2, an increase of the tension of the film will cause a displacement of the feeler 7 and of the slider 14 to the left (and out of the dotted line position of the slider 14) so that the extension 30 finally engages the lever 29 to impart to the latter a pivotal movement in the clockwise sense (is indicated by the dotted line position of lever 29). During this movement, the lever arm 29 strikes on the lever 31 to impart to the latter also a pivotal movement in the clockwise sense in FIG. 6. As a result, the detent pawl 33 releases the pin 35 and the spring 43, imparts to the lens carrier 34 a pivotal movement in the clockwise sense about the axis 36 so that the aperture plate 9 is moved to an open position. The film is now lifted from the stationary film gate 37 (FIGS. 2 and 3) and the pull-down claw also disengages the film. A drive means for the supply reel in the film cartridge 2 may now be started to effect a fast backwinding of the film. The mode selector switch of the apparatus is connected by a linkage, not shown, to the second arm of the lever 31 so that the lens carrier will be restored to its position for use when the apparatus is switched to forward or reverse projection.

The pin 24 mounted at the right-hand end of the slider 14 is in register with a switch 38, which is included in the circuit of the motor for driving the supply reel in cartridge 2. During a fast backwinding operation, the feeler 7 is held approximately in the position shown in solid lines in FIG. 2 because the film is under a substantial tension during this mode of operation. As soon as the trailing end of the film passes the feeler or the film has torn, the springs 20 and 21 displace the slider 14 to the right so that the pin 24 operates the switch 38 and interrupts the circuit of the motor for driving the supply reel in cartridge 2.

A two-armed lever 39 is pivoted to the plate 26 and has a first lever arm in register with the lever 22 and a second lever arm in register with the lever 29. The lever 39 has an oblique cam face 40 so that a pivotal movement of the lever 22 in the clockwise sense in FIG. 2 moves the first arm of the lever 39 to the rear. This rotation of the lever 39 causes a forward pivotal movement of the lever 29 about the hinge 41 out of the range of movement of the extension 30 of the slider. A spring 42 biases the lever 39 and holds it in the position shown in dash-dot lines in FIG. 5.

This arrangement ensures that the feeler 7 and the film-guiding surface will be displaced to the left during a displacement of the threading slider 12 to its operative position whereas the lens carrier 34 is not opened because the extension 30 during its movement to the left does not reach the lever 29, which has been swung out in a transverse direction.

Although not limited thereto, elements 30, 27, 29, and 39 comprise means for operatively connecting and disconnecting, respectively, said feeler to and from said control means, the latter comprising for example elements 31 and 33.

The invention is not restricted to the example which has been described hereinbefore. For instance, the lever 39 may be omitted and the lever 29 may be controlled directly by cams which are provided on the threading slider 12. The lever 29 may also cooperate with a mode selector switch of the apparatus to initiate automatically a reversal or stoppage of the projector. Finally, the invention may be applied not only to cartridge-fed projectors but also to reel-fed projectors, film viewers, microfilm readers and the like. In the example described hereinbefore, the feeler 7 serves not only for control purposes but also for damping and steadying the film loop. It will be understood that a separate damping and steadying device may be provided for this purpose. In this case the feeler 7 may be disposed at any desired point of the film path.

What is claimed is:

1. Film-handling apparatus, which comprises
film-guiding means for guiding a film in a path which comprises a looped portion,
a control device,
a film-damping feeler,
spring means tending to move said feeler into contact with film in said looped portion,
said feeler being movably responsive to the tension of film in contact with said feeler and to movably operative actuate said control device in response to a condition in which the tension of said film in contact with said feeler is above a predetermined range and when said feeler is simultaneously operatively connected to said control device,
film-threading means movable between an inoperative position and a threading position and in the latter are adapted to thread said film into said path, a lifting means for moving said feeler out of said path against the action of said spring means in response to a movement of said film-threading means into said threading position, and
means for operatively connecting said feeler and said control device when said film-threading means is in said inoperative position, and for disconnecting said feeler from said control device when said lifting means moves said feeler out of said path into said threading position of said film threading means.

2. Film-handling apparatus as set forth in claim 1, which consists of a motion film projector and comprising projector driving means.

3. Film-handling apparatus as set forth in claim 2, wherein said projector drive means is controlled by said control device.

4. Film-handling apparatus as set forth in claim 1, which comprises a sprocketless film-feeding system.

5. Film-handling apparatus as set forth in claim 1, in which
said means for operatively connecting and disconnecting said feeler and said control device comprises,
first and second parts,
said first part is connected to said feeler,
means for operatively discoupling said first and second parts and arranged in a manner such that upon movement of said feeler in response to said change of said tension above said predetermined range, said first part moves said second part to actuate said control device,
said feeler is movable in a first direction, and
said discoupling means moving at least one of said parts in a second direction, which is transverse to said first direction, in response to said movement of said threading means to said threading position and to said movement of said lifting means to operatively discouple said first and second parts, whereby said second part is inoperative to actuate said control device.

6. Film-handling apparatus as set forth in claim 5, in which said second part consists of a lever.

7. Film-handling apparatus as set forth in claim 5, in which
said feeler is movable in a plane in response to a change of said tension and
said second part is pivoted on an axis which lies in said plane.

8. Film-handling apparatus as set forth in claim 7, which comprises
pressure means for applying pressure to film in said path and said pressure means being spring loaded in a direction to remove said pressure means out of said film path,
detent means operatively connected with said control device and for holding said pressure means in position against its spring loading, said second part is movable in a path which is directed toward said control device when said feeler and control device are operatively connected by said means for operatively connecting and disconnecting said feeler and said control device, and
said second part actuating said control device, the latter then releasing said detent means from holding said pressure means in response to an increase of said tension of said film above said range, whereby said pressure means is moved out of said film path under its spring loading.

9. Film-handling apparatus as set forth in claim 8, wherein
said spring-loaded pressure means comprises a lens carrier.

10. Film-handling apparatus as set forth in claim 1, in which
said film-guiding means comprises,
a film-guiding surface carried by said feeler, and
stationary guiding surfaces arranged to cooperate with said film-guiding surface to form a closed film guide when said film-threading means is in said threading position.

11. Film-handling apparatus as set forth in claim 2, which comprises
switching means is arranged to de-energize said projector driving means in response to a decrease of said tension below said predetermined range.

* * * * *

UNITED STATES PATENT OFFICE
CERTIFICATE OF CORRECTION

Patent No. 3,807,844　　　　　　　　Dated April 9, 1974

Inventor(s) Andreas Erdkonig

It is certified that error appears in the above-identified patent and that said Letters Patent are hereby corrected as shown below:

On the cover sheet [73] "Raimund Huaser" should read -- Raimund Hauser --; insert [30] Foreign Application Priority Data March 18, 1969　　　Austria　　　A2674/69 --.

Signed and sealed this 24th day of September 1974.

(SEAL)
Attest:

McCOY M. GIBSON JR.　　　　　　　　C. MARSHALL DANN
Attesting Officer　　　　　　　　　Commissioner of Patents